United States Patent [19]

Bertram et al.

[11] Patent Number: 4,604,539

[45] Date of Patent: Aug. 5, 1986

[54] DRIVE MECHANISM WITH A ROTARY DRIVE MOTOR

[75] Inventors: Leo Bertram, Stolberg, Fed. Rep. of Germany; Romuald L. Bukoschek, Klagenfurt, Austria

[73] Assignee: U.S. Philips Corporation, New York, N.Y.

[21] Appl. No.: 734,419

[22] Filed: May 15, 1985

[30] Foreign Application Priority Data

May 23, 1984 [DE] Fed. Rep. of Germany ....... 3419177

[51] Int. Cl.[4] ............................................. H02K 7/06
[52] U.S. Cl. ........................................ 310/80; 310/81
[58] Field of Search ............................. 310/80, 81, 83

[56] References Cited

U.S. PATENT DOCUMENTS 1,661,433  3/1928  Little, Jr. ......................... 310/80 X
2,158,823  5/1939  Kohl ................................. 310/80

*Primary Examiner*—Donovan F. Duggan
*Attorney, Agent, or Firm*—Rolf E. Schneider

[57] ABSTRACT

The invention relates to a drive mechanism which comprises a single-phase synchronous motor (5) for converting the rotation of the motor shaft (3) into a pulsating axial movement by means of an eccentric cam (25). The motor shaft (3) carries a coaxial cylindrical body (13) whose eccentric cam (25) co-operates with a piston rod. The drive-shaft system comprising the motor shaft and body is supported in a multiple bearing comprising a broad-area bearing (23) for the circumferential surface (21) of the cylindrical body (13) and a shaft bearing (19) for the shaft end (15) which projects from the body (13) at the end which is remote from the motor (5). The end portion (29) of the piston rod is guided so as to be axially slidable.

6 Claims, 2 Drawing Figures

DRIVE MECHANISM WITH A ROTARY DRIVE MOTOR

The invention relates to a drive mechanism comprising a mains-powered rotary drive motor, for converting the rotary movement of the drive shaft into a pulsating axial movement by means of an eccentric cam, in particular for driving a pump-piston.

As is known, single-phase synchronous motors rotate with a constant speed, even under load if the loading torque does not exceed the maximum motor torque. In the case of overloading the motor stops and, under certain conditions, it is subsequently re-started in the opposite direction and with the synchronous speed if the loading torque has decreased in the meantime.

From U.S. Pat. No. 4,400,875 it is known to impart a reciprocating motion to a cutting member of a dry-shaving apparatus via a drive mechanism and an eccentric cam. Furthermore, it is known to mount an eccentric cam on a motor shaft to drive a cutting member of a dry-shaving apparatus with a vibratory movement. However, this is not accompanied by any substantial load surges at the points of reversal of the movement.

It is also known to employ dental water-jet apparatuses comprising small piston pumps, which can produce pulsating water jets for dental cleaning purposes. These small pumps are driven by means of split-pole motors. These motors require a comparatively high electric power and their dimensions are such that this restricts the freedom of design of such apparatuses. However, a major drawback is that the average number of pulses is load-dependent and voltage-dependent.

It is the object of the invention to provide a drive mechanism of the type defined in the opening paragraph, which can also handle pulsating loads, which as a result of its low power consumption may also be connected to isolating-transformer outlets in bathrooms, and which operates with an average number of pulses per minute which is independent of the load and the main voltage within the specified load range.

In accordance with the invention this object is achieved by means of a cylindrical body, which is force-coupled to the motor shaft of a single-phase synchronous motor, which is coaxial with the motor shaft, and which co-operates with a piston rod with an eccentric cam, and this drive-shaft system is supported in a multiple bearing arrangement, which comprises a broad-area bearing for the circumferential surface of the cylindrical body and a shaft bearing for a shaft end which projects from the cylindrical body at the end surface which is remote from the motor.

The single-phase synchronous motor provides an average pulse rate which is load and mains-voltage independent and which allows a greater freedom of design as a result of its compact construction. Its current consumption is so low that it may also be powered via an isolating transformer. The cylindrical body which revolves with the motor shaft enables the eccentric cam to be supported over a large surface area, in such a way that mechanical impulses originating from the piston rod and transmitted to the motor shaft are damped effectively. An additional damping is provided by the bearing of the outer shaft end. This renders the drive mechanism very suitable for use in dental water-jet apparatuses, which produce pulsating water jets.

In a further embodiment of the invention the motor shaft carries a freely rotatable damping disc and adjacent the damping disc an abutment disc is rigidly connected to the motor shaft. The damping disc enables unstable operating ranges of the motor to be shifted or damped in the case of variable loads, so that they have no effect.

In another embodiment of the invention the piston-rod end is slidably guided in an axial guide means, at least at the location of the eccentric cam, and the cam engages in a guide slot in the piston-rod end, which slot extends perpendicularly to the direction of movement of the piston rod. In this way the piston rod cannot perform any tilting movements, which could affect the piston sealing.

In yet another embodiment of the invention the bearing for the cylindrical body is a spiral-groove bearing. Such a bearing may be injection-moulded together with a housing for the drive mechanism.

An embodiment of the invention will now be described in more detail, by way of example, with reference to the accompanying drawing, in which.

Figures 1, 2:
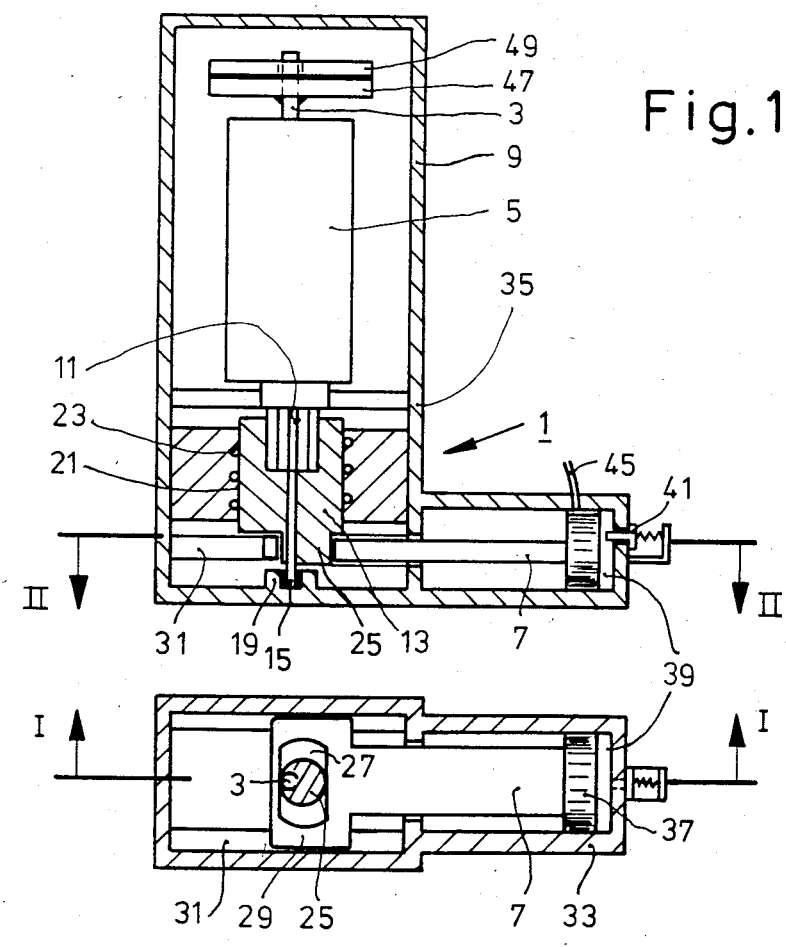
FIG. 1 is a sectional view, taken on the line I—I in FIG. 1, showing a drive mechanism which converts a rotary movement of a single-phase synchronous motor into a pulsating axial movement which is transmitted to a pump piston.
FIG. 2 shows the drive mechanism in a sectional view taken on the line II—II In FIG. 1.

FIG. 1 shows a drive mechanism 1 by means of which the rotation of a shaft 3 of a single-phase synchronous motor 5 is converted into a pulsating axial movement of a piston rod 7. The single-phase synchronous motor 5 is accommodated in a housing 9. A pinion 11 is secured to the motor shaft 3. This pinion cooperates with a cylindrical body 13, through which a shaft end 15 of the motor shaft 3 extends.

An end portion 15 of this shaft is journalled in a shaft bearing 19. The circumferential surface 21 of the cylindrical body 13 is supported in a grooved bearing 23 over the full width of the circumferential surface.

A cam 25 is arranged on the body 13, eccentrically with respect to the motor shaft 3. This eccentric cam 25 (FIG. 2) extends through a longitudinal slot 27 in the end portion of the piston rod 7.

The piston-rod end 29 is axially guided in the housing in groove-like guides 31. Thus, the piston-rod end can make only axial movements.

A piston 37, mounted on a piston rod 7, co-operates with a cylinder 33, which is mounted on the housing 35 of the drive mechanism 1. The piston 37 can compress water in a pump chamber 39 and discharge the water through an outlet 41 which can be closed by a non-return valve. The water is supplied via a supply line 45.

During operation pulsating water jets issue from the outlet 41. Via the piston rod 7 this gives rise to reactive forces which are taken up to such an extent by the shaft bearing 19 and the groove bearing 21 that the motor shaft 3 is not loaded in flexure.

The end portion of the motor shaft 3 which is remote from the body 13 carries an abutment disc 47, which is locked against rotation. This disc cooperates with a freely rotatably damping disc 49 on the motor shaft 3. In the case of varying loads this damping disc provides a shift of the unstable ranges. If the damping disc is made of a soft-magnetic material, it will be attracted towards the abutment disc 47 by the magnetic field of the motor when the motor is energized.

What is claimed is:

1. A drive mechanism comprising a mains-powered rotary drive motor, for converting the rotary movement of the drive shaft into a pulsating axial movement by means of an eccentric cam, in particular for driving a pump-piston, characterized by a cylindrical body (13), which is force-coupled to the motor shaft (3) of a single-phase synchronous motor (5), which is coaxial with the motor shaft (3), and which co-operates with a piston rod (7) with its eccentric cam (25), and which drive-shaft system is supported in a multiple bearing arrangement, which comprises a broad-area bearing (23) for the circumferential surface (21) of the cylindrical body (13) and a shaft bearing (19) for a shaft end (15) which projects from the cylindrical body (13) at the end surface which is remote from the motor.

2. A drive mechanism as claimed in claim 1, characterized in that the motor shaft (3) carries a freely rotatable damping disc (49).

3. A drive mechanism as claimed in claim 2, characterized in that adjacent the damping disc an abutment disc (47) is rigidly connected to the motor shaft (3).

4. A drive mechanism as claimed in claim 1, characterized in that the piston-rod end (29) is slidably guided in an axial guide means, at least at the location of the eccentric cam (25), and the cam (25) engages in a guide slot (27) in the piston-rod end (29), which slot extends perpendicularly to the direction of movement of the piston rod (7).

5. A drive mechanism as claimed in claim 1, characterized in that the bearing (23) for the cylindrical body (13) is a spiral-groove bearing.

6. A drive mechanism as claimed in claim 1, characterized in that the motor is coupled directly to the pump without an intermediate drive mechanism.

* * * * *